W. Horsfall.
Nut Machine.

Nº 87,046.      Patented Feb. 16, 1869.

Witnesses:

Inventor:
Wm Horsfall
per Brown Coombs & Cattys

UNITED STATES PATENT OFFICE.

WILLIAM HORSFALL, OF SING SING, NEW YORK.

Letters Patent No. 87,046, dated February 16, 1869.

IMPROVED MACHINE FOR MAKING NUTS.

The Schedule referred to in these Letters Patent and making part of the same.

*To all whom it may concern:*

Be it known that I, WILLIAM HORSFALL, of Sing Sing, in the county of Westchester, and State of New York, have invented a new and useful Improvement in Machines for Making Nuts, of which the following is a full, clear, and exact description, reference being had to the accompanying drawing, forming part of this specification, and in which—

Figure 1:
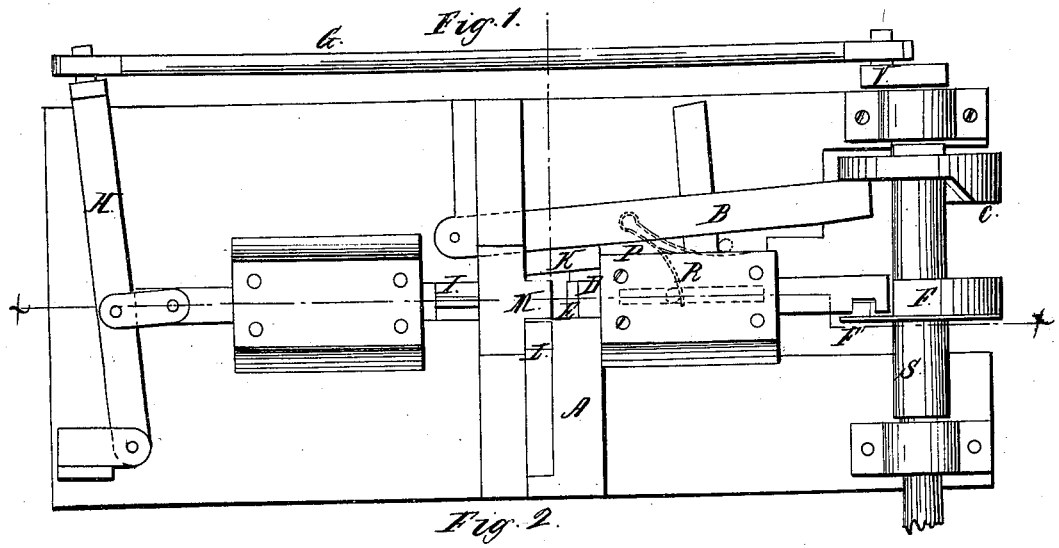
Figure 2:
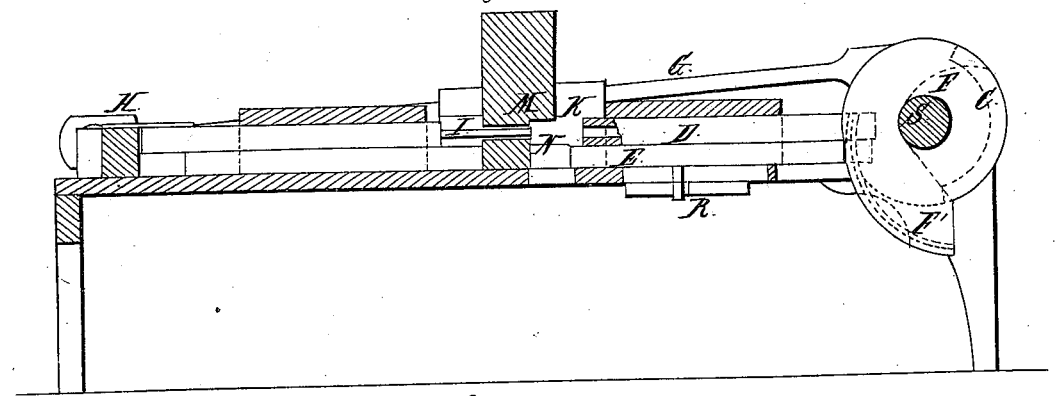
Figure 3:
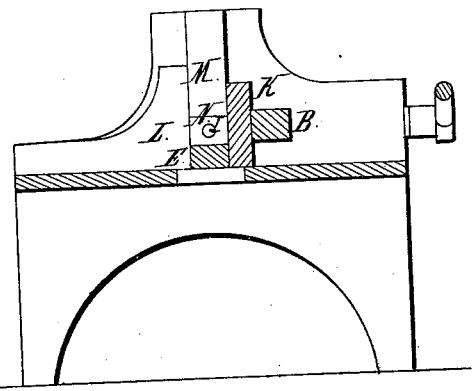

Figure 1 represents a plan of a nut-making machine constructed in accordance with my improvement;

Figure 2, a longitudinal sectional elevation, taken as indicated by the line $x$ $x$ in fig. 1; and Figure 3, a transverse section through the line $y$ $y$ in fig. 1.

Similar letters of reference indicate corresponding parts throughout the several figures.

This, my invention, consists—

First, in a novel combination of plungers, arranged one upon the other, and sliding independently of each other, but both being operated in one direction by the same cam, the upper one of such plungers, which is worked forward by a cam, serving to form a cutter or shears, to sever the blanks from the bar, also constituting the punch-block, while the lower one of such plungers, that is shot forward by a spring, serves as a movable bottom or lower side to the die in which the nuts are formed.

Secondly, the invention consists in a certain combination of plungers, operated by cams and spring, to cut the bar, and provide for the punching of the blank, and one of which forms a movable lower side to the die; stationary die-sides, the one of which acts as a cutting-block; a gauge, that is moved up to press on the cut blank, and serve as a side to the die; and a reciprocating punch; all being arranged and operating to secure a most efficient action in the formation of hot-pressed nuts.

Referring to the accompanying drawing—

A is a rest, along which the heated bar to be formed into nuts is fed, till it buts up against a gauge, K, when the latter, which has an intermittent motion toward and from the feed, occupies a backward position.

L is a stationary block that serves as a guide to the one side of the bar, in feeding it up to the gauge, and the front end of which forms one side of the die, and also serves as a stationary cutter for severing the bar into nut-blanks.

M is an upper, or overhanging block, arranged in advance of the block L, and that serves to form another side to the die.

D and E are plungers, arranged, one upon or above the other, and so as to be capable of a sliding motion across the line of bar-feed, or toward and from a fixed surface, N.

The upper plunger D operates, when projected forward, as a cutter or shears, in connection with the block L, to sever the bar into blanks; also as a punch-block. The other, or lower plunger, when shot forward, constitutes the fourth side of the die, and when moved back, allows the nut made in the die to drop or be delivered therefrom.

S is a main or driving-shaft, on or connected with which are cams C and F F'.

The cam C operates, at the proper interval, by or through a lever, B, to drive forward or inward the gauge K, and to hold it in such position, when said device is required to form a side to the die, and in connection with the front end of the block L, to press on the cut edges of the blank, and to give them a smooth and regular finish.

P is a spring, for throwing back the gauge K after the cam C has ceased to hold it.

The plunger D is forced forward by the action of a cam, F, and is drawn back by a scroll-projection or cam, F'.

This latter cam also draws back the lower plunger E, a spring, R, serving to shoot the latter plunger forward when it is released from the cam.

I is a sliding punch operated by a lever, H, through a connecting-rod, G, by a crank, V, on the shaft S.

When the bar is fed to form a blank, the gauge K is held in a back position by the spring P. The punch I also has retired, and the plungers D and E are both being drawn or held back by the cam F'.

The end of the bar having been forced up against the gauge, the next action is the release of the plungers D and E by the cam F', which leaves the spring R at liberty to shoot forward the lower plunger E, thus establishing the lower side to the die.

After this, the cam F, in coming round, strikes on the plunger D, and drives it forward to cut off a blank from the bar, and press it up against the surface N.

As this action is being completed, or when completed, and while the plungers D and E are held in their advance positions by the spring R and cam F, the cam C operates upon the lever B, to throw and hold the gauge K forward, and during such advance position of the gauge, the punch I is made to advance, to punch the hole in the blank.

The nut having been thus formed, the cam C releases hold on the lever B, which causes the spring P to throw back the gauge, the punch I retires, and the plungers D and E are drawn back by the scroll or cam F', thus leaving the nut at liberty to drop from the opened die.

After this the bar is again fed or pushed forward and the operation repeated, as before.

What is here claimed, and desired to be secured by Letters Patent, is—

1. The arrangement and combination of the cams F F', plungers D E, and spring R, all constructed and operating substantially in the manner described.

2. The combination of the cams F F', plungers D E, spring R, guide L, gauge K, punch I, and fixed surfaces M N, for operation relatively to each other, essentially as specified.

WM. HORSFALL.

Witnesses:
 WALTER FRANKLIN,
 JAMES T. COLLYER.